United States Patent Office 2,797,242
Patented June 25, 1957

2,797,242
SUBSTITUTED A-BENZYLPHENETHYLAMINES AND METHODS FOR PRODUCING THE SAME

William H. Edgerton, Huntington Woods, and Robert L. Hull, Detroit, Mich., assignors to Parke, Davis & Company, Detroit, Mich., a corporation of Michigan No Drawing. Application August 11, 1953,
Serial No. 373,654

15 Claims. (Cl. 260—570.8)

This invention relates to substituted α-benzylphenethylamines and to acid addition salts of the same and also to methods for producing these compounds. More particularly, the invention relates to N-phenalkyl-α-benzylphenethylamines which in their free base form have the formula,

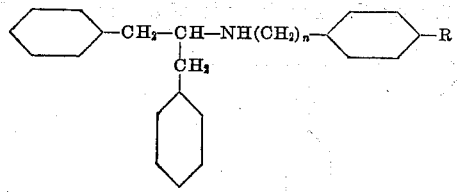

where $n$ is 1 to 3 and R is a hydrogen atom, a halogen atom, an alkoxy group, an alkyl group, a halogenated alkoxy group or a benzyloxy group.

In accordance with the invention N-phenalkyl-α-benzylphenethyl-amines having the above formula are preferably produced by reacting α-benzylphenethylamine with an aldehyde of formula,

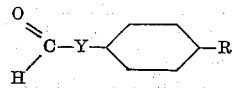

to produce a Schiff base compound of formula,

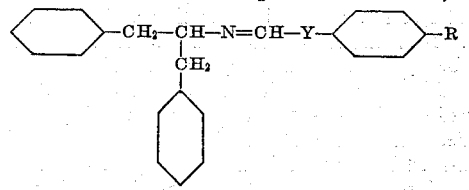

and subsequently subjecting said Schiff base compound to catalytic hydrogenation; where R has the same significance as given above and Y represents a direct bond from the carbonyl group to the phenyl ring, an alkylene radical containing 1 or 2 carbon atoms or a vinylene radical. The transformations involved can be diagrammatically illustrated as follows:

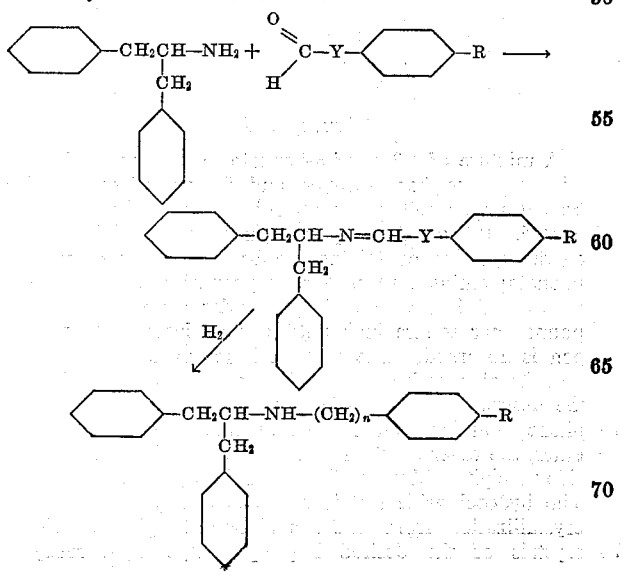

In carrying out the first step of the process described above approximately equivalent quantities of α-benzylphenethylamine and the aldehyde compound can be employed but in most instances it is preferable to use a slight excess of the aldehyde compound. The reaction can be carried out in the presence or absence of a solvent but it is preferably carried out in a substantially anhydrous organic solvent such as a lower aliphatic alcohol, benzene, xylene, toluene, ether and esters of lower fatty acids. The temperature is not particularly critical and can be varied from about 15 to 150° C. but best results are obtained by using a temperature between 60 and 100° C.

The reduction of the Schiff base compound produced in the first step of the process is carried out in a substantially anhydrous organic solvent using gaseous hydrogen and a hydrogenation catalyst. As solvents lower aliphatic alcohols, benzene, xylene, toluene, ether and esters of lower fatty acids can be used. Suitable hydrogenation catalysts include Raney nickel and noble metal catalysts such as platinum oxide, palladium oxide, palladium and platinum. During the reduction the temperature is maintained below 100° C. and preferably in the neighborhood of 25 to 60° C. It is not necessary to employ hydrogen pressures in excess of about ten atmospheres in order to bring about the reaction and in most instances hydrogen pressures of about two to four atmospheres suffice to bring about the reaction within a reasonable time.

In the preferred method of carrying out the overall process the reaction mixture from the first step of the process is subjected to hydrogenation without isolation and purification of the Schiff base compound.

Also in accordance with the invention the N-phenalkyl-α-benzylphenethylamines can be produced by reacting a compound of formula,

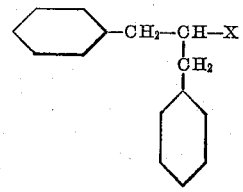

with a compound of formula,

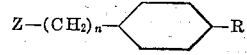

where $n$ and R have the same significance as given above and X is a halogen atom or a primary amino group and Z is a primary amino group when X is a halogen atom and Z is a halogen atom when X is a primary amino group. The process can be illustrated diagrammatically as follows:

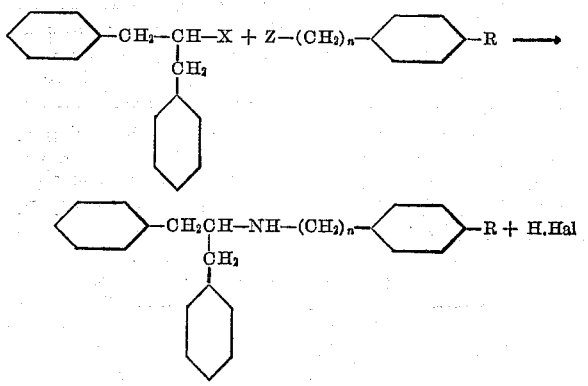

where Hal is a halogen atom. The process can be carried out in the presence or absence of a solvent. As solvents lower aliphatic alcohols, benzene, toluene, xylene, ether and the like can be used. The relative quantities of the reactants are not particularly critical. When approximately one equivalent or an excess of the halide compound is employed for each equivalent of the primary amino compound the product is the hydrohalide salt of the N-phenalkyl-α-benzylphenethylamine. If two or more equivalents of the primary amino compound are used for each equivalent of the halide compound or in the instance where the reaction is carried out in the presence of an acid binding agent, the product is the free base of the N-phenalkyl-α-benzylphenethylamine. As acid binding agents inorganic bases such as the alkali metal hydroxides, alkali metal carbonates, alkali metal bicarbonates, alkali metal alkoxides and alkaline earth metal hydroxides and tertiary organic amines such as pyridine, triethylamine, quinoline and N,N-dimethylaniline can be used. The temperature of the reaction can be varied from 50 to 150° C. but it is preferable to use a reaction temperature of 80 to 110° C.

The free bases, N-phenalkyl-α-benzylphenethylamines, of the invention form well defined acid addition salts upon treatment with mineral acids such as hydrochloric acid, hydrobromic, hydroiodic, phosphoric, sulfuric and sulfamic acid. The reaction can be carried out in either aqueous or non-aqueous solvents such as lower aliphatic alcohols, ether, benzene, toluene and xylene.

The compounds of the invention are particularly useful as intermediates for the production of therapeutically important water insoluble salts of penicillin such as those of penicillin G which are described and claimed in our copending application Serial No. 373,655, filed under date herewith, now Patent No. 2,735,848, dated February 21, 1956. The preferred method for producing these water insoluble salts of penicillin involves reacting approximately equivalent quantities of a mineral acid salt of the N-phenalkyl-α-benzylphenethylamine with a water soluble salt of penicillin such as potassium penicillin in an aqueous reaction medium at a temperature below 40° C. and collecting the product. If desired, these salts can also be produced by reacting the free base of the N-phenalkyl-α-benzylphenethylamine with an equivalent amount of penicillinic acid in an anhydrous organic solvent such as ether preferably at a temperature between 0 and 20° C. The products of the invention are also of value in the isolation and purification of penicillin from fermentation filtrates or concentrates.

The invention is illustrated by the following examples:

Example 1

A mixture of 4.2 g. of α-benzylphenethylamine, 2.1 g. of benzaldehyde and 50 ml. of ethanol is heated to reflux for 90 minutes and then the solution cooled. 0.1 g. of 5% palladium on charcoal catalyst is added to the solution containing benzilidine-α-benzylphenethylamine and the mixture is shaken with hydrogen under a pressure of 50 pounds per square inch until one equivalent hydrogen is absorbed. The solution is filtered to remove the catalyst and the alcohol is removed by distillation. The residue which consists of N-benzyl-α-benzylphenethylamine is dissolved in 200 ml. of ether, the ether solution dried and dry hydrogen chloride bubbled through the dried solution until no further precipitate forms. The precipitate is collected and recrystallized from aqueous alcohol to obtain the desired N-benzyl-α-benzylphenethylamine hydrochloride as colorless crystals; M. P. 224–6° C. The formula of this compound is,

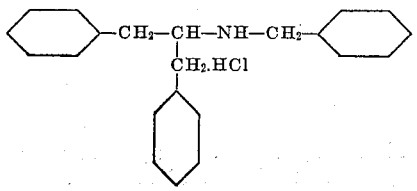

Example 2

A mixture of 4.2 g. of α-benzylphenethylamine, 2.7 g. of p-anisaldehyde and 50 ml. of ethanol is heated to reflux for 90 minutes and then the solution cooled. 0.1 g. of platinum oxide is added to the solution containing the Schiff base of α-benzylphenethylamine and p-anisaldehyde and the mixture shaken with hydrogen under a pressure of 50 pounds per square inch until one equivalent of hydrogen is absorbed. The catalyst is removed by filtration and the alcohol distilled from the filtrate to obtain the desired free base of N-p-methoxybenzyl-α-benzylphenethylamine. The free base is dissolved in 200 ml. of ether, the ether solution dried and dry hydrogen chloride bubbled through the solution until no further precipitate is obtained. The N-p-methoxybenzyl-α-benzylphenethylamine hydrochloride is collected and purified by recrystallization from aqueous alcohol; M. P. 224–5° C. The formula of this compound is,

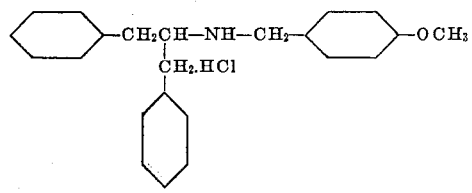

Example 3

A mixture of 4.2 g. of α-benzylphenethylamine, 3.0 g. of p-ethoxybenzaldehyde and 50 ml. of ethanol is heated under reflux for 90 minutes and the solution cooled. 0.1 g. of 5% palladium on charcoal is added to the solution containing the Schiff base of α-benzylphenethylamine and p-ethoxybenzaldehyde and the mixture is shaken with hydrogen under a pressure of 50 pounds per square inch until one equivalent of hydrogen is absorbed. The catalyst is removed by filtration and the alcohol is distilled from the filtrate to obtain the free base of N-p-ethoxybenzyl-α-benzylphenethylamine. The free base is dissolved in 200 ml. of ether, the ether solution dried and the dried solution treated with an excess of dry hydrogen chloride. The precipitated hydrochloride salt is collected and purified by recrystallization from aqueous alcohol to obtain colorless crystals of the desired N-p-ethoxybenzyl-α-benzylphenethylamine hydrochloride; M. P. 220–2° C. The formula of this compound is,

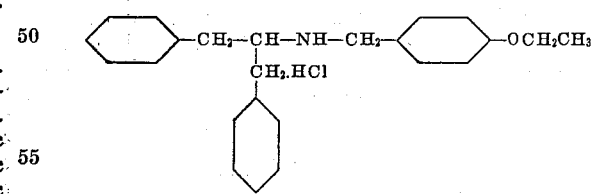

Example 4

A mixture of 4.2 g. of α-benzylphenethylamine, 3.3 g. of p-n-propoxybenzaldehyde and 50 ml. of ethanol is heated under reflux for 90 minutes and the solution cooled. 0.1 g. of 5% palladium on charcoal is added to the solution containing the Schiff base of α-benzylphenethylamine and p-n-propoxybenzaldehyde and the mixture shaken with hydrogen under a pressure of 50 pounds per square inch until one equivalent of hydrogen is absorbed. The catalyst is removed by filtration and the alcohol is evaporated on a steam bath to obtain the desired free base of N-p-n-propoxybenzyl-α-benzylphenethylamine. The free base is dissolved in 200 ml. of ether, the ether solution dried and the amine hydrochloride precipitated by the addition of dry hydrogen chloride. The hydrochloride salt is collected and purified by recrystallization from aqueous alcohol to give colorless crystals of the desired N-p-n-propoxybenzyl-α-benzylphenethylamine hydrochloride; M. P. 208–9° C. The formula of this product is,

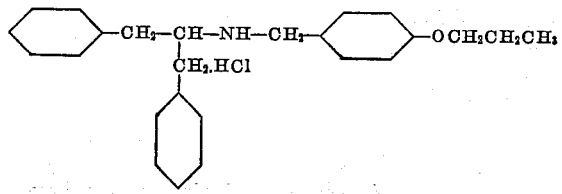

Example 5

A mixture of 4.2 g. of α-benzylphenethylamine, 3.3 g. of p-isopropoxybenzaldehyde and 50 ml. of ethanol is heated under reflux for 90 minutes and the solution cooled. 0.1 g. of 5% palladium on charcoal is added to the solution containing the Schiff base of α-benzylphenethylamine and p-isopropoxybenzaldehyde and the mixture shaken with hydrogen under a pressure of 50 pounds per square inch until one equivalent of hydrogen is absorbed. The catalyst is removed by filtration and the alcohol distilled from the filtrate to obtain the free base of N-p-isopropoxybenzyl-α-benzylphenethylamine. The free base is dissolved in 200 ml. of ether, the solution dried and treated with dry hydrogen chloride until no further precipitate is formed. The precipitated hydrochloride salt is collected and recrystallized from aqueous alcohol to obtain colorless crystals of the desired N-p-isopropoxybenzyl - α - benzylphenethylamine hydrochloride; M. P. 231–2° C. The formula of this compound is,

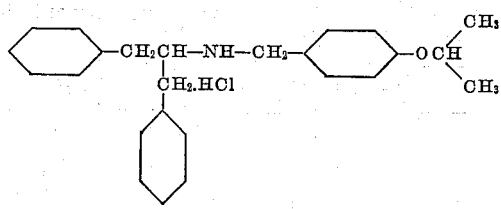

Example 6

A mixture of 4.2 g. of α-benzylphenethylamine, 4 g. of p-γ-chloropropoxybenzaldehyde and 50 ml. of ethanol is heated under reflux for 90 minutes and the solution cooled. 0.1 g. of 5% palladium on charcoal is added to the solution containing the Schiff base of α-benzylphenethylamine and p-γ-chloropropoxybenzaldehyde and the mixture shaken with hydrogen under a pressure of 50 pounds per square inch until one equivalent of hydrogen is absorbed. The catalyst is removed by filtration and the alcohol is removed from the filtrate by vacuum distillation to obtain the free base of N-p-γ-chloropropoxybenzyl-α-benzylphenethylamine. The free base is dissolved in 200 ml. of ether, the ether solution dried and the amine hydrochloride precipitated by the addition of dry hydrogen chloride. The precipitated hydrochloride salt is collected and recrystallized from aqueous alcohol to obtain colorless crystals of the desired N-p-γ-chloropropoxybenzyl-α - benzylphenethylamine hydrochloride; M. P. 206–7° C. The formula of this compound is,

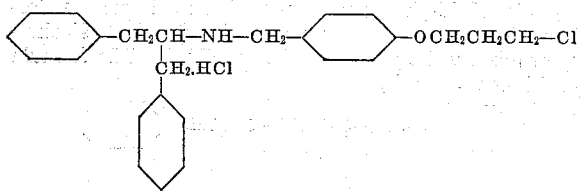

Example 7

A mixture of 4.2 g. of α-benzylphenethylamine, 3.6 g. of p-n-butoxybenzaldehyde and 50 ml. of ethanol is heated under reflux for 90 minutes and the solution cooled. 0.1 g. of platinum oxide catalyst is added to the solution containing the Schiff base of p-n-butoxybenzaldehyde and α-benzylphenethylamine and the mixture shaken with hydrogen under a pressure of 50 pounds per square inch until one equivalent of hydrogen is absorbed. The catalyst is removed by filtration and the alcohol distilled from the filtrate to obtain the free base of N-p-butoxybenzyl-α-benzylphenethylamine. The free base is dissolved in 200 ml. of ether, the solution dried and the solution treated with an excess of dry hydrogen chloride. The hydrochloride salt which precipitates is collected and purified by recrystallization from aqueous alcohol to obtain colorless crystals of the desired N-p-n-butoxybenzyl-α-benzylphenethylamine hydrochloride; M. P. 201–3° C. The formula of this compound is,

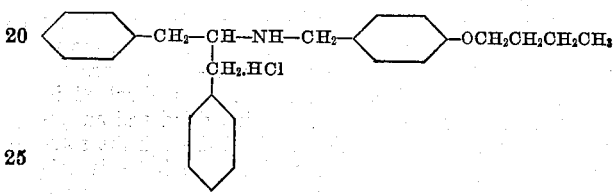

Example 8

A mixture of 4.2 g. of α-benzylphenethylamine, 3.8 g. of p-n-amyloxybenzaldehyde and 50 ml. of ethanol is heated under reflux for 90 minutes and the solution cooled. 0.1 g. of 5% palladium on charcoal catalyst is added to the solution containing the Schiff base of α-benzylphenethylamine and p-n-amyloxybenzaldehyde and the mixture shaken with hydrogen under a pressure of 50 pounds per square inch until one equivalent of hydrogen is absorbed. The catalyst is removed by filtration and the alcohol is removed from the filtrate by vacuum distillation to obtain the free base of N-p-n-amyloxybenzyl-α-benzylphenethylamine. The free base is dissolved in 200 ml. of ether, the ether solution dried and dry hydrogen chloride bubbled through the solution until no further precipitate forms. The solid is collected and recrystallized from aqueous alcohol to obtain the desired N-p-n-amyloxybenzyl-α-benzylphenethylamine hydrochloride; M. P. 198–9° C. The formula of this product is,

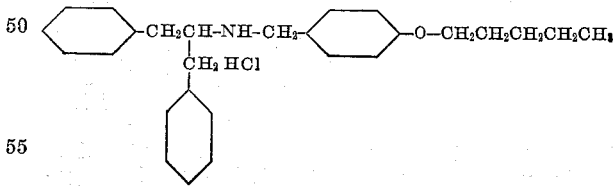

Example 9

A mixture of 4.2 g. of α-benzylphenethylamine, 5.2 g. of p-n-decyloxybenzaldehyde and 100 ml. of ethanol is heated under reflux for 90 minutes. 0.1 g. of platinum oxide catalyst is added to the cooled solution containing the Schiff base of α-benzylphenethylamine and p-n-decyloxybenzaldehyde and the mixture shaken with hydrogen under a pressure of 50 pounds per square inch until one equivalent of hydrogen is absorbed. The catalyst is removed by filtration and the alcohol is distilled from the filtrate in vacuo to obtain the free base of N-p-decyloxybenzyl-α-benzylphenethylamine. The free base is dissolved in 200 ml. of ether, the ether solution dried and an excess of dry hydrogen chloride bubbled through the solution. The hydrochloride salt which precipitates is collected and recrystallized from aqueous alcohol to obtain the desired N - p - n-decyloxybenzyl - α - benzylphenethylamine hydrochloride; M. P. 171–3° C. The formula of this compound is,

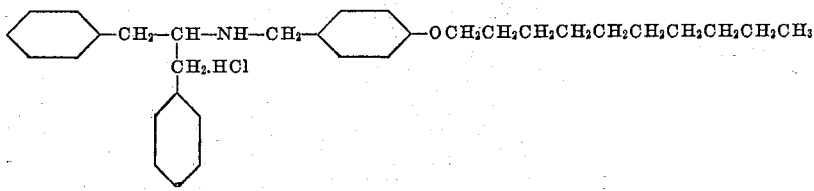

Example 10

A mixture of 10.6 g. of α-benzylphenethylamine, 6.6 g. of cinnamaldehyde and 75 ml. of ethanol is heated under reflux for 90 minutes and the solution cooled. 0.1 g. of platinum oxide catalyst is added to the solution containing the Schiff base of cinnamaldehyde and α-benzylphenethylamine and shaken with hydrogen under a pressure of 50 pounds per square inch until two equivalents of hydrogen are absorbed. The catalyst is removed by filtration and the alcohol is distilled from the filtrate in vacuo to obtain the desired free base of N-γ-phenylpropyl-α-benzylphenethylamine. The free base is dissolved in 200 ml. of ether, the ethereal solution dried and an excess of dry hydrogen chloride bubbled through the solution. The hydrochloride salt which precipitates is collected and recrystallized from aqueous alcohol to obtain the desired N-γ-phenylpropyl-α-benzylphenethylamine hydrochloride; M. P. 192–3° C. The formula of this product is,

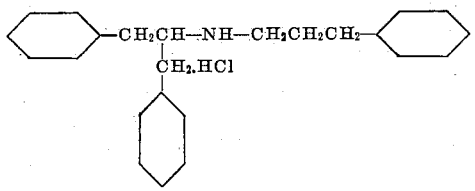

Example 11

A mixture of 10.6 g. of α-benzylphenethylamine, 7.5 g. of p-isopropylbenzaldehyde and 100 ml. of ethanol is heated under reflux for 90 minutes and the solution cooled. 0.1 g. of 5% palladium on charcoal catalyst is added to the solution containing the Schiff base of α-benzylphenethylamine and p-isopropylbenzaldehyde and the mixture shaken with hydrogen under a pressure of 50 pounds per square inch until one equivalent of hydrogen is absorbed. The catalyst is removed by filtration and the alcohol is removed by distillation in vacuo to obtain the free base of N-p-isopropylbenzyl-α-benzylphenethylamine. The free base is dissolved in 300 ml. of ether, the ethereal solution dried and the dried solution treated with dry hydrogen chloride until a precipitate no longer forms. The precipitated hydrochloride salt is collected and recrystallized from aqueous alcohol to obtain colorless crystals of the desired N-p-isopropylbenzyl-α-benzylphenethylamine hydrochloride; M. P. 210–11° C. The formula of this compound is,

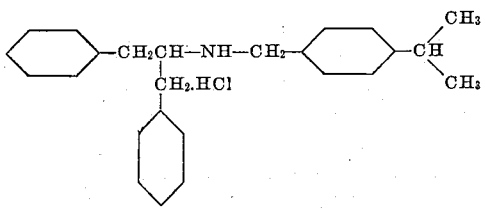

Example 12

A mixture of 4.2 g. of α-benzylphenethylamine, 2.8 g. of p-chlorobenzaldehyde and 50 ml. of ethanol is heated under reflux for 90 minutes and the solution cooled. 0.1 g. of 5% palladium on charcoal catalyst is added to the solution containing the Schiff base of α-benzylphenethylamine and p-chlorobenzaldehyde and the mixture shaken with hydrogen under a pressure of 50 pounds per square inch until one equivalent of hydrogen is absorbed. The catalyst is removed by filtration and the alcohol is distilled from the filtrate in vacuo to obtain the free base of N-p-chlorobenzyl-α-benzylphenethylamine. The free base is dissolved in 200 ml. of ether, the ether solution dried and the solution treated with an excess of gaseous hydrogen chloride. The insoluble product is collected and recrystallized from aqueous alcohol to obtain the desired N-p-chlorobenzyl-α-benzylphenethylamine hydrochloride; M. P. 255–7° C. The formula of this compound is,

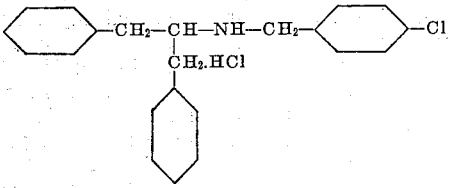

Example 13

A mixture consisting of 10.5 g. of α-benzylphenethylamine and 6.5 g. of p-methylbenzylchloride in 7 ml. of ethanol is heated under reflux for three hours, the solution cooled and the crystals of N-p-methylbenzyl-α-benzylphenethylamine hydrochloride washed with ether. After recrystallization from ethanol the product melts at 222–3° C. The formula of this compound is,

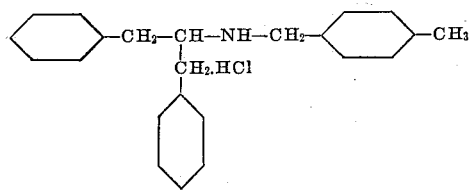

Example 14

A mixture consisting of 4.2 g. of α-benzylphenethylamine and 5 g. of p-bromobenzylbromide in 100 ml. of ethanol is heated under reflux for 20 hours, the solution cooled and the crystals of N-p-bromobenzyl-α-benzylphenethylamine hydrobromide collected and purified by recrystallization from ethanol. The formula of this product is,

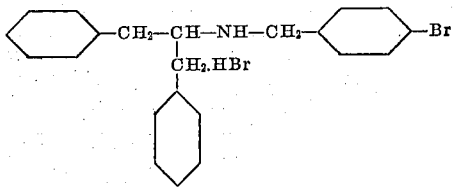

Example 15

A mixture of 10.5 g. of α-benzylphenethylamine, 9.3 g. of phenethylbromide and 50 ml. of ethanol is heated under reflux for 20 hours, the solution cooled and the crystals of N-phenethyl-α-benzylphenethylamine hydrobromide collected. After recrystallization from alcohol-ether mixture the product melts at 188° C. The formula of this compound is,

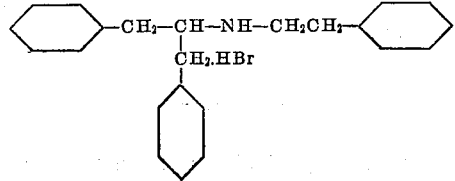

Example 16

A mixture consisting of 8.4 g. of α-benzylphenethylamine and 8.5 g. of p-benzyloxybenzaldehyde in 100 ml. of ethanol is heated under reflux for 90 minutes and the solution cooled. 0.2 g. of platinum oxide catalyst is added to the solution containing the Schiff base of α-benzylphenethylamine and p-benzyloxybenzaldehyde and the mixture shaken with hydrogen under a pressure of 50 pounds per square inch until one equivalent of hydrogen is absorbed. The catalyst is removed by filtration and the alcohol distilled from the filtrate to obtain the free base of N-p-benzyloxybenzyl-α-benzylphenethylamine. The free base is dissolved in 400 ml. of ether, the solution dried and the solution treated with an excess of dry hydrogen chloride. The hydrochloride salt is precipitated, collected and purified by recrystallization from aqueous alcohol to obtain colorless crystals of the desired N-p-benzyloxybenzyl-α-benzylphenethylamine hydrochloride; M. P. 223–5° C. The formula of this compound is,

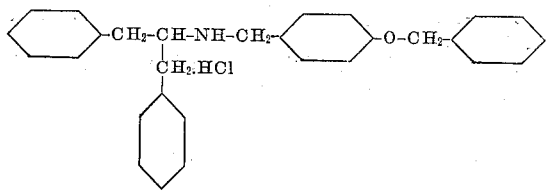

Example 17

A mixture consisting of 8.4 g. of α-benzylphenethylamine, 7.1 g. of p-sec.-butoxybenzaldehyde and 100 ml. of ethanol is heated under reflux for 90 minutes and the solution cooled. 0.2 g. of 5% palladium on charcoal catalyst is added to the solution containing the Schiff base of α-benzylphenethylamine and p-sec.-butoxybenzaldehyde and the mixture shaken with hydrogen under a pressure of 50 pounds per square inch until one equivalent of hydrogen is absorbed. The catalyst is removed by filtration and the alcohol distilled from the filtrate in vacuo to obtain the free base of N-p-sec.-butoxybenzyl-α-benzylphenethylamine. The free base is dissolved in 400 ml. of ether and the ether solution dried and dry hydrogen chloride bubbled through the solution until no further precipitate forms. The solid is collected and recrystallized from aqueous alcohol to obtain the desired N-p-sec.-butoxybenzyl-α-benzylphenethylamine hydrochloride in pure form; M. P. 228–29° C. The formula of this compound is,

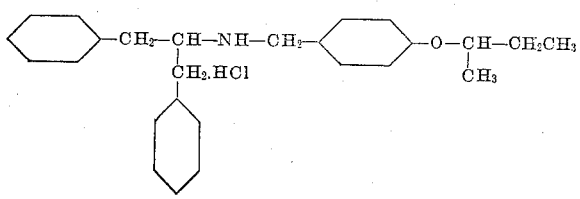

Example 18

A mixture consisting of 8.4 g. of α-benzylphenethylamine, 7.7 g. of p-isoamyloxybenzaldehyde and 100 ml. of ethanol is heated under reflux for 90 minutes. 0.2 g. of palladium oxide catalyst is added to the cooled solution containing the Schiff base of α-benzylphenethylamine and p-isoamyloxybenzaldehyde and the mixture shaken with hydrogen under a pressure of 50 pounds per square inch until one equivalent of hydrogen is absorbed. The catalyst is removed by filtration and the alcohol distilled from the filtrate in vacuo to obtain the free base of N-p-isoamyloxybenzyl-α-benzylphenethylamine. The free base is dissolved in 400 ml. of ether, the ether solution dried and an excess of dry hydrogen chloride bubbled through the solution. The hydrochloride salt which precipitates is collected and recrystallized from aqueous alcohol to obtain the desired N-p-isoamyloxybenzyl-α-benzylphenethylamine hydrochloride; M. P. 218–20° C. The formula of this compound is,

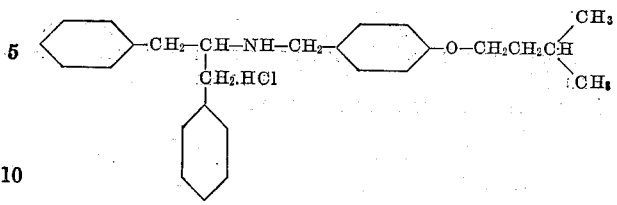

The starting materials used in the practice of the invention are, with the exception of the α-benzylphenethyl halides and the p-haloalkoxy substituted phenylaldehydes, well known and readily available. For example, α-benzylphenethylamine can be obtained by the reduction of dibenzyl ketone in the presence of ammonia as described in British Patent No. 646,594. The p-alkoxyphenyl aldehydes can be produced as described in J. prakt. Chem. 155, 338 (1940) while benzaldehyde, phenylacetaldehyde and cinnamaldehyde are well known. The halogenated and alkylated aldehydes are also well known, and in the instances where they may be specifically new they may be readily obtained by the methods used to produce similar known alkylated or halogenated phenyl-substituted aldehydes. The phenalkyl halide and amine starting materials such as the benzyl, phenethyl and phenylpropyl halides and amines are also well known or in the instances where specifically new they are easily obtainable by the methods used to produce the analogous known compounds. In the case of the halides this usually involves treatment of the corresponding alcohol with a halogenating agent such as thionyl chloride, hydrogen bromide, phosphorus oxychloride and the like while the amines are usually produced by reacting the halides with ammonia or by reduction of the appropriate nitrites.

The α-benzylphenethyl halides can be produced by reducing dibenzyl ketone to dibenzyl carbinol and reacting this alcohol with a halogenating agent such as thionyl chloride, phosphorus oxychloride, phosphorus pentachloride, hydrobromic acid and the like in the known manner. The following is a specific example showing the application of this method for producing α-benzylphenethyl bromide.

0.6 g. of sodium borohydride is added slowly with stirring to 5 g. of dibenzyl ketone dissolved in 100 ml. of ethanol and the mixture stirred for fifteen minutes. 5 ml. of 1 N hydrochloric acid is added and the mixture stirred. The reaction mixture is diluted with water and the waxy precipitate of α-benzylphenethyl alcohol collected.

4.6 g. of α-benzylphenethyl alcohol is added to 50 ml. of acetic acid saturated with hydrogen bromide and the mixture heated for twenty-four hours at 100° C. The reaction mixture is poured into water and the mixture extracted with ether. The ether extract is washed with water and then with dilute bicarbonate solution and finally with water. The ether solution is dried and the ether distilled to obtain the a-benzylphenethyl bromide which can, if desired, be purified further by distillation in vacuo.

The p-haloalkoxy substituted phenylaldehydes can be produced by refluxing an alkali metal salt of the corresponding p-hydroxyphenyl aldehyde with a halogenated alkyl halide in absolute ethanol. The following specific example showing the preparation of p-γ-chloropropoxybenzaldehyde is illustrative of the reaction conditions and method of isolation used in the production of this type of starting material.

36.6 g. of p-hydroxybenzaldehyde is added to a solution of 7 g. of sodium in 300 ml. of absolute ethanol and the mixture heated under reflux for eight hours. The reaction mixture is allowed to stand and then diluted with one liter of water. The mixture is extracted with ether, the ether extract dried and the solution distilled in vacuo. The desired product, p-γ-chloropropoxybenzaldehyde, is the fraction boiling at 100–115° C. at 0.6 to 0.3 mm. of mercury.

What we claim is:

1. A compound of the class consisting of an N-phenalkyl-α-benzylphenethylamine and its mineral acid addition salts said N-phenalkyl-α-benzylphenethylamine having in the free base form the formula,

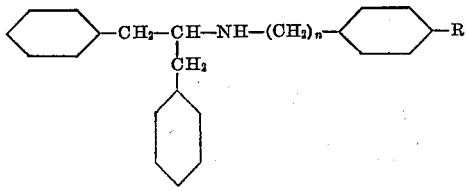

where $n$ is 1 to 3 and R is a member of the class consisting of a hydrogen atom, a halogen atom, an alkoxy group, a lower alkyl group, a halogenated lower alkoxy group and a benzyloxy group.

2. A mineral acid addition salt of an N-phenalkyl-α-benzylphenethylamine of formula,

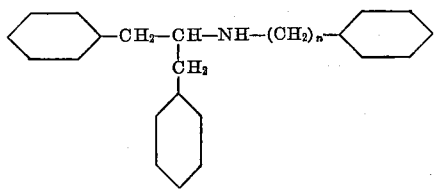

where $n$ is 1 to 3.

3. A mineral acid addition salt of N-γ-phenylpropyl-α-benzylphenethylamine.

4. N-γ-phenylpropyl-α-benzylphenethylamine hydrochloride.

5. A mineral acid addition salt of an N-phenalkyl-α-benzylphenethylamine of formula,

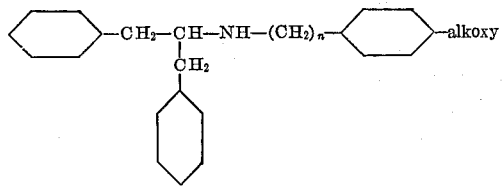

where $n$ is 1 to 3.

6. A mineral acid addition salt of an N-phenalkyl-α-benzylphenethylamine of formula,

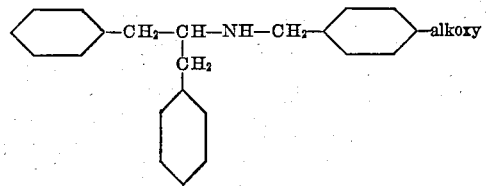

7. A mineral acid addition salt of N-p-n-butoxybenzyl-α-benzylphenethylamine.

8. N-p-n-butoxybenzyl-α-benzylphenethylamine hydrochloride.

9. A mineral acid addition salt of N-p-amyloxybenzyl-α-benzylphenethylamine.

10. N-p-amyloxybenzyl-α-benzylphenethylamine hydrochloride.

11. A mineral acid addition salt of N-p-decyloxybenzyl-α-benzylphenethylamine.

12. N-p-decyloxybenzyl-α-benzylphenethylamine hydrochloride.

13. A mineral acid addition salt of an N-phenalkyl-α-benzylphenethylamine of formula,

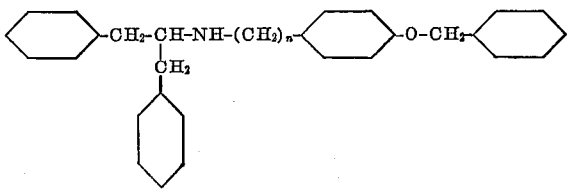

where $n$ is 1 to 3.

14. A mineral acid addition salt of N-p-benzyloxybenzyl-α-benzylphenethylamine.

15. N-p-benzyloxybenzyl-α-benzylphenethylamine hydrochloride.

References Cited in the file of this patent

UNITED STATES PATENTS 2,006,114   Rosenmund et al. _____ June 25, 1935

FOREIGN PATENTS 617,647   Germany _____ Aug. 8, 1935

OTHER REFERENCES

Rosenmund et al.: "Berichte" (1939), vol. 72B, p. 19–28.